United States Patent
Gu et al.

(10) Patent No.: US 12,361,578 B2
(45) Date of Patent: Jul. 15, 2025

(54) METHOD AND DEVICE FOR DEPTH MAP COMPLETION

(71) Applicant: Realsee (Beijing) Technology Co., Ltd., Beijing (CN)

(72) Inventors: Xiaodong Gu, Beijing (CN); Cihui Pan, Beijing (CN)

(73) Assignee: Realsee (Beijing) Technology Co., Ltd., Beijing (CN)

( * ) Notice: Subject to any disclaimer, the term of this patent is extended or adjusted under 35 U.S.C. 154(b) by 421 days.

(21) Appl. No.: 17/849,999

(22) Filed: Jun. 27, 2022

(65) Prior Publication Data

US 2023/0035477 A1  Feb. 2, 2023

(30) Foreign Application Priority Data

Jul. 27, 2021  (CN) .......................... 202110849655.6

(51) Int. Cl.
    *G06T 7/55*    (2017.01)
    *G06T 3/40*    (2024.01)
    *G06T 7/90*    (2017.01)

(52) U.S. Cl.
CPC ................ *G06T 7/55* (2017.01); *G06T 3/40* (2013.01); *G06T 7/90* (2017.01); *G06T 2200/04* (2013.01);
(Continued)

(58) Field of Classification Search
CPC .... G06T 7/50; G06T 7/55; G06T 7/90; G06T 3/40; G06T 3/4023; G06T 2200/04;
(Continued)

(56) References Cited

U.S. PATENT DOCUMENTS

2013/0107010 A1* 5/2013 Hoiem ................... H04N 13/20
    348/46
2015/0049937 A1* 2/2015 Choi .................... G06T 3/4061
    382/154
(Continued)

FOREIGN PATENT DOCUMENTS

CN      109602410 A    4/2019
CN      109767467 A    5/2019
(Continued)

OTHER PUBLICATIONS

Patent Cooperation Treaty, International Search Report, International Application No. PCT/CN2022/072963 (Mar. 23, 2022).
(Continued)

*Primary Examiner* — Oneal R Mistry
*Assistant Examiner* — Duy Tran
(74) *Attorney, Agent, or Firm* — Leydig, Voit & Mayer, Ltd.

(57) ABSTRACT

A method includes obtaining a color image and a first depth image; determining a target area of the first depth image, the target area of the first depth image having a first set of pixels with a first set of depth values; based on comparing an accuracy of the first set of depth values with a preset accuracy threshold: determining a target area of the color image that corresponds to the target area of the first depth image; determining, based on the target area of the color image, a second set of pixels with a second set of depth values for the target area of the first depth image; generating a second depth image that replaces the first set of pixels of the first depth image with the second set of pixels with the second set of depth values; outputting the second depth image as a three dimensional image.

20 Claims, 10 Drawing Sheets

(52) U.S. Cl.
CPC .............. *G06T 2207/10024* (2013.01); *G06T 2207/10028* (2013.01); *G06T 2207/20081* (2013.01)

(58) Field of Classification Search
CPC . G06T 2207/10024; G06T 2207/10028; G06T 2207/20081; G06T 7/10; G06T 7/11; G06T 7/136; G06T 2207/20104; G06V 30/19013; G06V 40/161; G06V 40/162; G06V 2201/12
See application file for complete search history.

(56) References Cited

U.S. PATENT DOCUMENTS

| | | | | |
|---|---|---|---|---|
| 2017/0289515 | A1* | 10/2017 | Li | H04N 23/20 |
| 2019/0197735 | A1* | 6/2019 | Xiong | G06T 5/77 |
| 2019/0362511 | A1* | 11/2019 | Jouppi | G06T 5/70 |
| 2021/0065392 | A1* | 3/2021 | Bleyer | H04N 13/254 |
| 2021/0208262 | A1 | 7/2021 | Silver et al. | |

FOREIGN PATENT DOCUMENTS

| | | |
|---|---|---|
| CN | 112036284 A | 12/2020 |
| CN | 112102199 A | 12/2020 |
| CN | 112802081 A | 5/2021 |
| CN | 113592935 A | 11/2021 |

OTHER PUBLICATIONS

Patent Cooperation Treaty, Written Opinion of the International Searching Authority, International Application No. PCT/CN2022/072963 (Mar. 23, 2022).

\* cited by examiner

METHOD AND DEVICE FOR DEPTH MAP COMPLETION

CROSS-REFERENCE TO RELATED APPLICATION

This patent application claims the benefits of Chinese Patent Application No. 202110849655.6, filed on Jul. 27, 2021, which is incorporated by reference herein in its entirety.

FIELD

The present disclosure generally relates to techniques of image processing, and more specifically, to a method, a device, and a computer-readable medium for processing depth images.

BACKGROUND

Electronic devices, for example, mobile devices are generally equipped with a light detection and ranging (LiDAR) system that generates depth images. However, many of such electronic devices do not provide depth images with sufficiently high accuracies of depth values of pixels. For example, many such electronic devices merely provide depth images with less accuracy or precision due to restrictions on power consumption or other reasons. In practice, one way to generate depth images with high accuracy is to use software to complement the depth images that are provided by such electronic devices. Still, accuracies of depth values of pixels of software-complemented depth images are less satisfying.

Therefore, there is a need to for an electronic device that provides depth image with sufficiently accuracy.

SUMMARY

In an exemplary embodiment, the present disclosure provides a method for depth images having pixels with accurate depth values. The method includes obtaining a color image and a first depth image, wherein a scene illustrated by the color image corresponds to a scene illustrated by the first depth image; determining a target area of the first depth image, the target area of the first depth image having a first set of pixels with a first set of depth values. Based on comparing an accuracy of the first set of depth values with a preset accuracy threshold: the method includes determining a target area of the color image that corresponds to the target area of the first depth image; determining, based on the target area of the color image, a second set of pixels with a second set of depth values for the target area of the first depth image; generating a second depth image that replaces the first set of pixels of the first depth image with the second set of pixels with the second set of depth values. The method further includes outputting the second depth image to a processor to generate a three dimensional image of the scene.

In an exemplary embodiment, determining, based on the target area of the color image, the second set of pixels with the second set of depth values for the target area of the first depth image includes determining, based on the target area of the color image and the target area of the first depth image in relation to the first depth image, the second set of pixels with the second set of depth values for the target area of the first depth image.

In an exemplary embodiment, determining the second set of pixels with the second set of depth values for the target area of the first image is based on obtaining a marked first depth image by marking the target area of the first depth image, wherein generating the second depth image is based on inputting the color image and the marked first depth image into a depth model.

In exemplary embodiment, the depth model includes an encoder, a decoder, and a downsampler, and wherein generating the second depth image by inputting the color image and the marked first depth image into the depth model includes generating, by the encoder based on the color image, data representing the characteristics of the color image; generating, by the downsampler based on the marked first depth image, data representing the characteristics of the marked first depth image; and generating, by the decoder based on the data representing the characteristics of the color image and the data representing the characteristics of the marked first depth image, the second depth image.

In an exemplary embodiment, the encoder performs downsampling on the color image, wherein the encoder includes one downsampling layer more than that of the downsampler.

In an exemplary embodiment, the method further includes training the depth model, wherein training the depth model includes obtaining a set of training samples, the set of training samples including input data and expected output data that corresponds to the input data, wherein the input data includes color image samples and first depth image samples that correspond to the color image samples, the first depth image samples being marked, and wherein the expected output data includes expected second depth image samples; and training, by using a machine learning algorithm having the input data as an input and the expected output data as an expected output to obtain the depth model.

In an exemplary embodiment, the marked first depth image samples include a rectangular area, the rectangular area being a position indicated by position information of the set of training samples, and wherein the rectangular area is randomly determined and has a third set of pixels with a third set of depth values.

In an exemplary embodiment, the expected second depth image samples are image samples that replace the third set of pixels with the third set of depth values of the rectangular area of the marked first depth image samples with a fourth set of pixels with a fourth set of depth values of the rectangular area of the marked first depth image samples, the fourth set of depth values is larger than the preset accuracy threshold.

In an exemplary embodiment, the loss of the depth model is determined based on at least one of: a mean of relative error of actual output data and the expected output data, a mean of relative error of the gradient of the actual output data and the gradient of the expected output data, or a structural similarity between the actual output data and the expected output data.

In an exemplary embodiment, a scene illustrated by the color image samples corresponds to a scene illustrated by the first depth image samples.

In an exemplary embodiment, the present disclosure provides a device. The device includes a processor and a memory electronically coupled to the processor and configured to store computer-executable instructions, which, when executed by the processor, cause the processor to carry out the method.

In an exemplary embodiment, the present disclosure provides a non-transitory computer-readable medium, having computer-executable instructions stored thereon, the computer-executable instructions, when executed by one or more processor, cause a processor to facilitate the method.

BRIEF DESCRIPTION OF THE DRAWING(S)

DETAILED DESCRIPTION

Exemplary embodiments of the present disclosure provide a method, a device, and a computer-readable medium for depth images having pixels with high accurate depth values based on a light detection and ranging (LiDAR) system. The method, device, and a computer-readable medium for depth images having pixels with accurate depth values disclosed herein may generate depth images having pixels with high depth values by using an electronic device with limited power consumption, for example, a mobile device. The method, device, and a computer-readable medium for depth images having pixels with accurate depth values disclosed herein may replace pixels with depth values of a target area of a depth image with pixels with higher depth values. The target area of the depth image has a smooth boundary in relation to the depth image.

According to some exemplary embodiments, a method for depth images having pixels with accurate depth values based on a LiDAR system may be applied in various electronic devices, for example, in mobile devices, computer systems, and servers. The method includes obtaining a color image and a first depth image. A scene illustrated by the color image corresponds to a scene illustrated by the first depth image. The method further includes determining a target area of the first depth image. The target area of the first depth image has a first set of pixels with a first set of depth values. If the accuracy of the first set of depth values is less than or equal to a preset accuracy threshold, the method further includes determining a target area of the color image that corresponds to the target area of the first depth image; determining, based on the target area of the color image, a second set of pixels with a second set of depth values for the target area of the first depth image; and generating a second depth image that replaces the first set of pixels with the first set of depth values of the target area of the first depth image with the second set of pixels with the second set of depth values.

The method further includes outputting the second depth image to a processor to generate a three dimensional image of the scene. As such, less costly and more portable electronic devices may generate depth images having pixels with accurate depth values to produce more accurate three dimensional image of scenes. These scenes may include any scenes for causal and professional uses.

Figure 1:
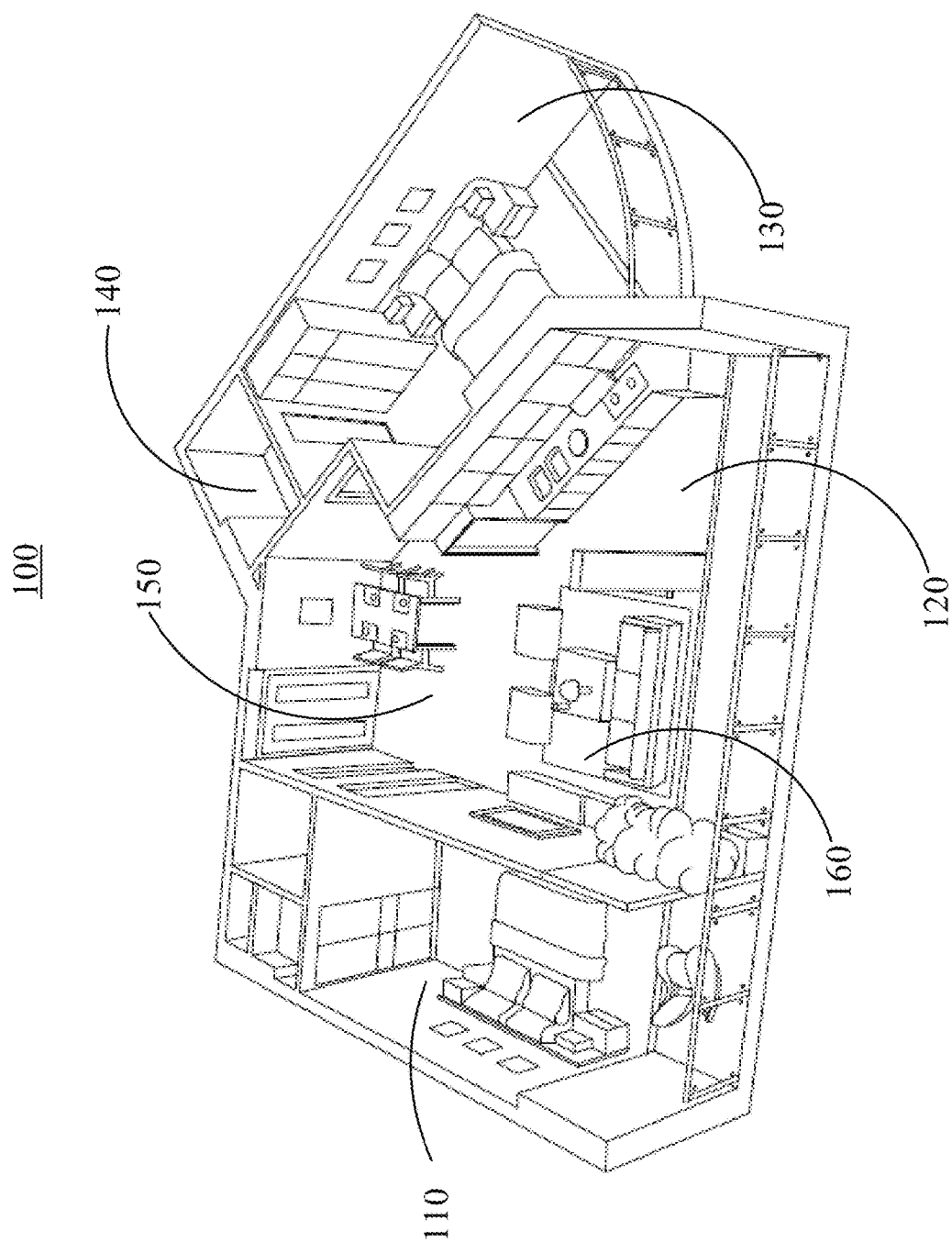
FIG. 1 is a three dimensional (3D) virtual reality (VR) environment according to one or more examples of the present disclosure.

FIG. 1 is a three dimensional (3D) virtual reality (VR) environment according to one or more examples of the present disclosure.

As shown in FIG. 1, 3D VR environment 100 may simulate or represent a residential unit, such as an apartment or house floor. It is noted that 3D VR environment 100 may include a VR representation of any in-door space or environment. In FIG. 1, 3D VR environment 100 may include one or more functional spaces, such as 110, 120, 130, 140, 150, and 160. As used herein, a functional space refers to an enclosed or partially enclosed space that is associated with a function. Under some circumstances, a functional space may correspond to a room. For example, functional space 110 may correspond to a first bedroom, and functional space 130 may correspond to a second bedroom. Under some circumstances, a functional space may correspond to an enclosed or partially enclosed space within or adjacent to a room. For example, functional space 140 may correspond to a closet. Under some circumstances, a function space may correspond to an area that is generally used for a purpose. For example, functional space 120 may correspond to a kitchen area, functional space 150 may correspond to a dining area, and functional space 160 may correspond to a living room. Although functional spaces 120, 150, and 160 may share the same room, e.g., an enclosed area, they may be considered as different functional spaces due to their different functions.

Figure 2:
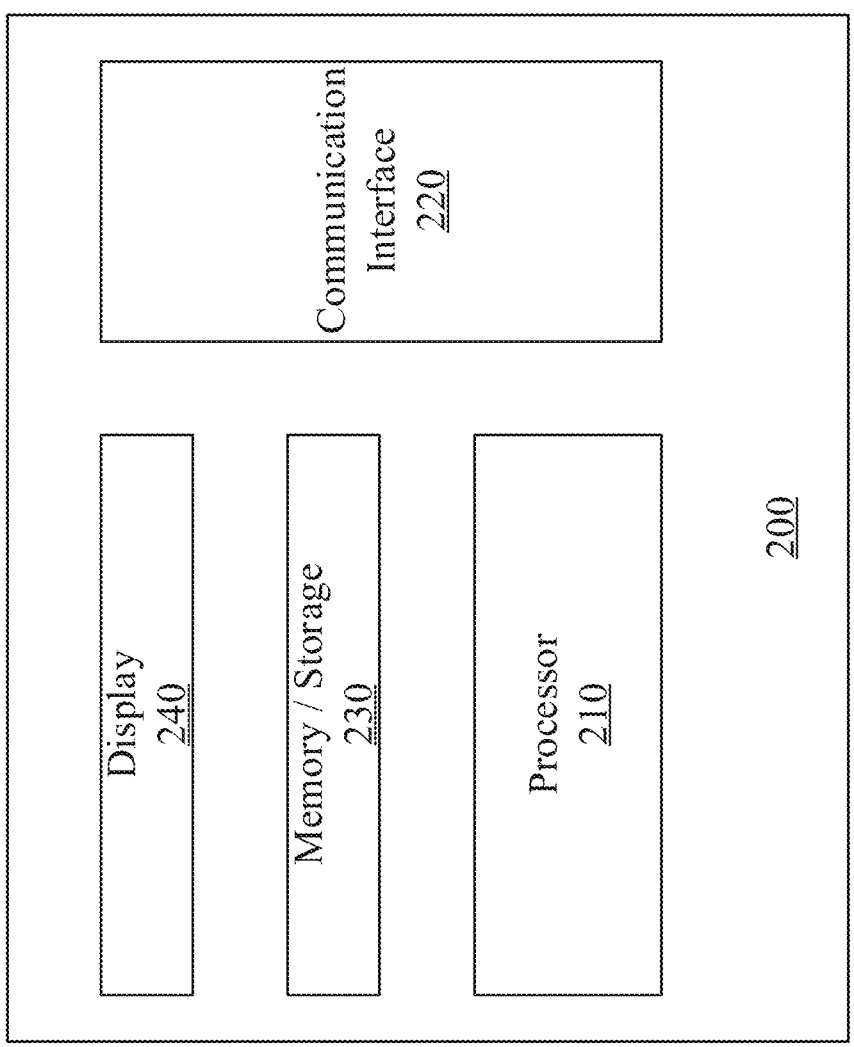
FIG. 2 is a block diagram of an exemplary computer system configured to implement various functions of the present disclosure.

FIG. 2 is a block diagram of an exemplary computer system configured to implement various functions of the present disclosure.

For example, the computer system 200 may be configured as a server to create or reconstruct VR environment 100 shown in FIG. 1. In another example, computer system 200 may be configured as a terminal device to display or enrich VR environment 100 shown in FIG. 1. As shown in FIG. 2, computer system 200 may include a processor 210, a communication interface 220, a memory/storage 230, and a display 240. Memory/storage 230 may be configured to store computer-readable instructions that, when executed by processor 210, can cause processor 210 to perform various operations disclosed herein. Memory 230 may be any non-transitory type of mass storage, such as volatile or non-volatile, magnetic, semiconductor-based, tape-based, optical, removable, non-removable, or other type of storage device or tangible computer-readable medium including, but not limited to, a read-only memory (ROM), a flash memory, a dynamic random-access memory (RAM), and a static RAM.

Processor 210 as well as the processors and engines described below may be configured to perform the operations in accordance with the instructions stored in memory (e.g., memory 230). Processor 210 may include any appropriate type of general-purpose or special-purpose microprocessor, digital signal processor, microcontroller, or the like. Processor 210 may be configured as a separate processor module dedicated to performing one or more specific operations disclosed herein. Alternatively, processor 210 may be configured as a shared processor module for capable of performing other operations unrelated to the one or more specific operations disclosed herein.

Communication interface 220 may be configured to communicate information between computer system 200 and other devices or systems. For example, communication interface 220 may include an integrated services digital network (ISDN) card, a cable modem, a satellite modem, or a modem to provide a data communication connection. As another example, communication interface 220 may include a local area network (LAN) card to provide a data communication connection to a compatible LAN. As a further example, communication interface 220 may include a high-speed network adapter such as a fiber optic network adaptor, 10G Ethernet adaptor, or the like. Wireless links can also be implemented by communication interface 220. In such an implementation, communication interface 220 can send and receive electrical, electromagnetic or optical signals that carry digital data streams representing various types of information via a network. The network can typically include a cellular communication network, a Wireless Local Area Network (WLAN), a Wide Area Network (WAN), or the like.

Communication interface 220 may also include various input/output (I/O) devices such as a keyboard, a mouse, a touchpad, a touch screen, a microphone, a camera, a biosensor, etc. A user may input data to a terminal device through communication interface 220.

Display 240 may be integrated as part of computer system 200 or may be provided as a separate device communicatively coupled to computer system 200. Display 240 may include a display device such as a Liquid Crystal Display (LCD), a Light Emitting Diode Display (LED), a plasma display, or any other type of display, and provide a Graphical User Interface (GUI) presented on the display for user input and data depiction. In some embodiments, display device 240 may include a VR goggle, a pair of VR glasses, or other similar devices that provide immersive VR experience. For example, VR environment 100 may be displayed on display 240. In some embodiments, display 240 may be integrated as part of communication interface 220.

Figure 3:
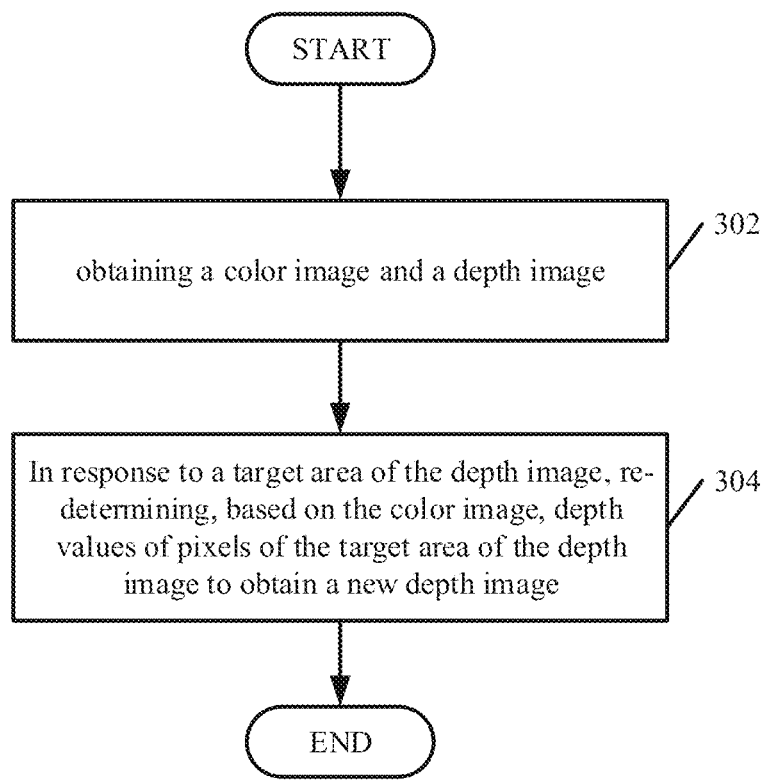
FIG. 3 is an exemplary flowchart depicting a process for depth images having pixels with accurate depth values according to an exemplary embodiment of the present disclosure.

FIG. 3 shows an exemplary flowchart depicting a process 300 for depth images having pixels with high accurate depth values according to an exemplary embodiment of the present disclosure.

At step 302, a processor receives a color image and a depth image.

In some exemplary embodiments, a color image may be a digital color image, which includes color information for each pixel. For example, the color information provides three values for red, green, and blue (RGB) of each pixel, which may be interpreted as coordinates in some color space. For example, RGB color space may be used for displaying a color image. Different weighted combinations of RGB for each pixel enable a showing of an enormous number of colors in a color image, which can be distinguished by a human eye. 8, 16, or 24 bits per pixel may be used for a color image format in various situations. For example, if 8 bits per pixel or 8 bits per RGB channel is used, there may be a showing of 256×256×256=16.7 million colors.

In some exemplary embodiments, a depth image may include information relating to distances of surfaces of scene objects from a viewpoint. For example, a viewpoint may be a central axis of view of an electronic device, which may be in the direction of the electronic device's Z axis. Thus, it may be regarded as depth information of the scene objects. A depth image may show luminance in proportion to the distance from the electronic device. For example, a viewpoint may be a central axis of view of a nominal focal plane. Thus, a depth image may also show luminance in relation to the distance from a nominal focal plane.

In some exemplary embodiments, the color image and the depth image are generated by an electronic device or by different electronic devices, and then are received through wired or wireless connections. These electronic devices are equipped with a LiDAR system and therefore are able to generate depth images. These electronic devices can be also equipped with software to generate depth images. These electronic devices may be mobile devices, such as a mobile phone, a personal application device (PAD), etc.

In some instances, due to limited power consumption of an electronic device, the depth image is not sufficiently accurate, that is, the depth image includes pixels with less accurate depth values. Software is usually used to complement the depth image, however, in some examples, it still cannot provide a depth image having pixels with satisfying depth values. For example, when using an electronic device with limited power consumption, one exemplary reason that causes inaccuracy may be, if distances of surfaces of scene objects from a viewpoint are not measured or calibrated sufficiently accurately by an electronic device, the depth values are not satisfied. For instance, if distances of surfaces of scene objects from an electronic device increase due to the resolution of the electronic device, a point density may decrease. This may cause the depth image to not include sufficient information relating to distances of surfaces of scene objects from a viewpoint. Additionally, and/or alternatively, the inaccuracy of the depth map may be due to the fact that the surface depth measurement of such objects by the measuring device is error-prone (e.g., for a black surface, the measurement light is absorbed and little to no feedback is received back, which causes the measurement depth to be inaccurate as the measurement depth cannot be provided). Additionally, and/or alternatively, the software used to complement the depth image might not have a high prediction accuracy. The process described herein further generates a new depth image including pixels with more accurate and satisfying depth values.

In some exemplary embodiments, a scene illustrated by the color image corresponds to a scene illustrated by the depth image, that is, the color image can be regarded as the color image of the depth image. In some examples, the scene illustrated by the color image and the scene illustrated by the depth image may include a same scene. In some examples, the scene illustrated by the color image and the scene illustrated by the depth image may include a partially same scene. In some examples, these scenes may be for casual or professional purposes. In some examples, the color image may be a panoramic color image. Accordingly, the depth image may be a panoramic depth image.

At step 304, the processor re-determines, based on the color image, depth values of pixels of a target area of the depth image to obtain a new depth image in response to the target area of the depth image.

For instance, in some exemplary embodiments, an accuracy of each depth value of each pixel of the depth image is provided when an electronic device generates the depth image. For example, a confidence scale of 0, 1, 2, and etc. may be used to indicate an accuracy of a depth value. The higher the confidence scale, the more accurate a depth value that corresponds to a pixel of the depth image. In other words, the electronic device may provide an accuracy value (e.g., a value on the confidence scale) for each pixel of each depth image. Additionally, and/or alternatively, the electronic device may provide an accuracy map (e.g., a map on the confidence scale) for the depth image. Additionally, and/or alternatively, an accuracy of each depth value of each pixel of the depth image can be determined by a machine-learning algorithm.

In some variations, the processor may use an accuracy threshold to determine the target area. For example, the processor may compare the accuracy values (e.g., a value provided by the electronic device and/or determined using a machine-learning algorithm or a formula) with the accuracy threshold. Based on the comparison, the processor may determine the target area. In some instances, the accuracy threshold is preset. For instance, if an accuracy of a depth value of a pixel of the depth image is less than or equal to the accuracy threshold, the depth value of the pixel of the depth image is less accurate, and may be flagged to be used to determine the target area.

In some exemplary embodiments, using the determined accuracy values of each depth value of each pixel of the depth image and the preset accuracy threshold, a target area of the depth image having pixels with less accurate depth values can be obtained. Based on more detailed information, such as RGB values of each pixel, provided by the color image that corresponds to the depth image, a new depth image having pixels with more accurate depth values can be generated. For example, first, a target area of the color image that corresponds to the target area of the depth image is determined. Second, the target area of the color image is input into a depth model for re-determining depth values of pixels of the target area of the depth image. The depth model is described below according to FIGS. 6 and 7. In some variations, the depth model is trained in advance, and thus, is able to re-determine depth values of pixels of the target area of the depth image. The re-determined depth values of pixels of the target area of the depth image are more accurate than the original ones. Then, a new depth image is generated, which replaces the original pixels with original depth values of the target area of the depth image with the re-determined depth values of pixels of the target area of the depth image.

Figure 4:
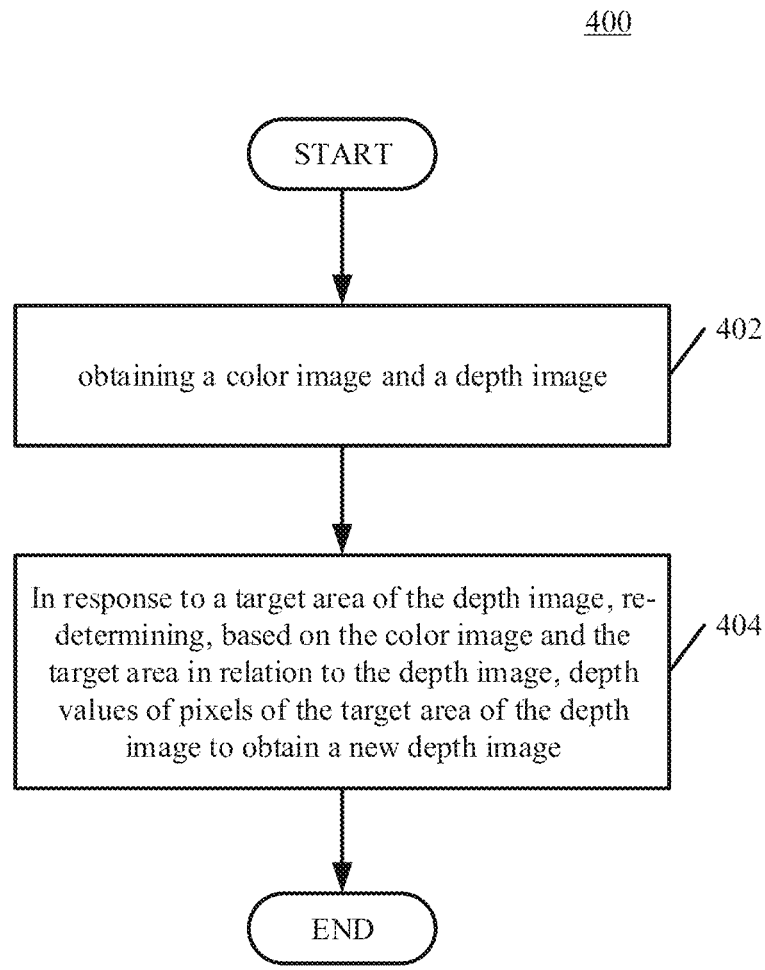
FIG. 4 is an exemplary flowchart depicting a process for depth images having pixels with accurate depth values according to another exemplary embodiment of the present disclosure.

FIG. 4 shows an exemplary flowchart depicting a process 400 for depth images having pixels with accurate depth values according to an exemplary embodiment of the present disclosure.

As shown, step 402 is the same as step 302 shown in FIG. 3, which is described above.

At step 404, the processor re-determines, based on the color image and the target area in relation to the depth image, depth values of pixels of a target area of the depth image to obtain a new depth image in response to the target area of the depth image.

In some exemplary embodiments, if an accuracy of each depth value of each pixel of an area of the depth image is less than or equal to the preset accuracy threshold, the area of the depth image is marked as a target area of the depth image. Based on the color image and the target area in relation to the depth image, the processor re-determines depth values of pixels of a target area of the depth image. As such, a new depth image is generated, which replaces the original pixels with original depth values of the target area of the depth image with the re-determined depth values of pixels of the target area of the depth image.

In some exemplary embodiments, step 404 includes the following sub-steps:

First, the processor marks a target area of the depth image to obtain a marked depth image. The target area of the depth image includes pixels with less accurate depth values. For example, an accuracy of each depth value of each of the pixels is less than or equal to a preset accuracy threshold. The information of the accuracy of each depth value of each of the pixels may be obtained when an electronic device generates the depth image.

Second, the color image and the marked depth image are inputted into a depth model for re-determining depth values of pixels of the target area of the depth image. The re-determined depth values of pixels of the target area of the depth image are more accurate than the original ones. The new depth image is hereby generated.

Figure 5:
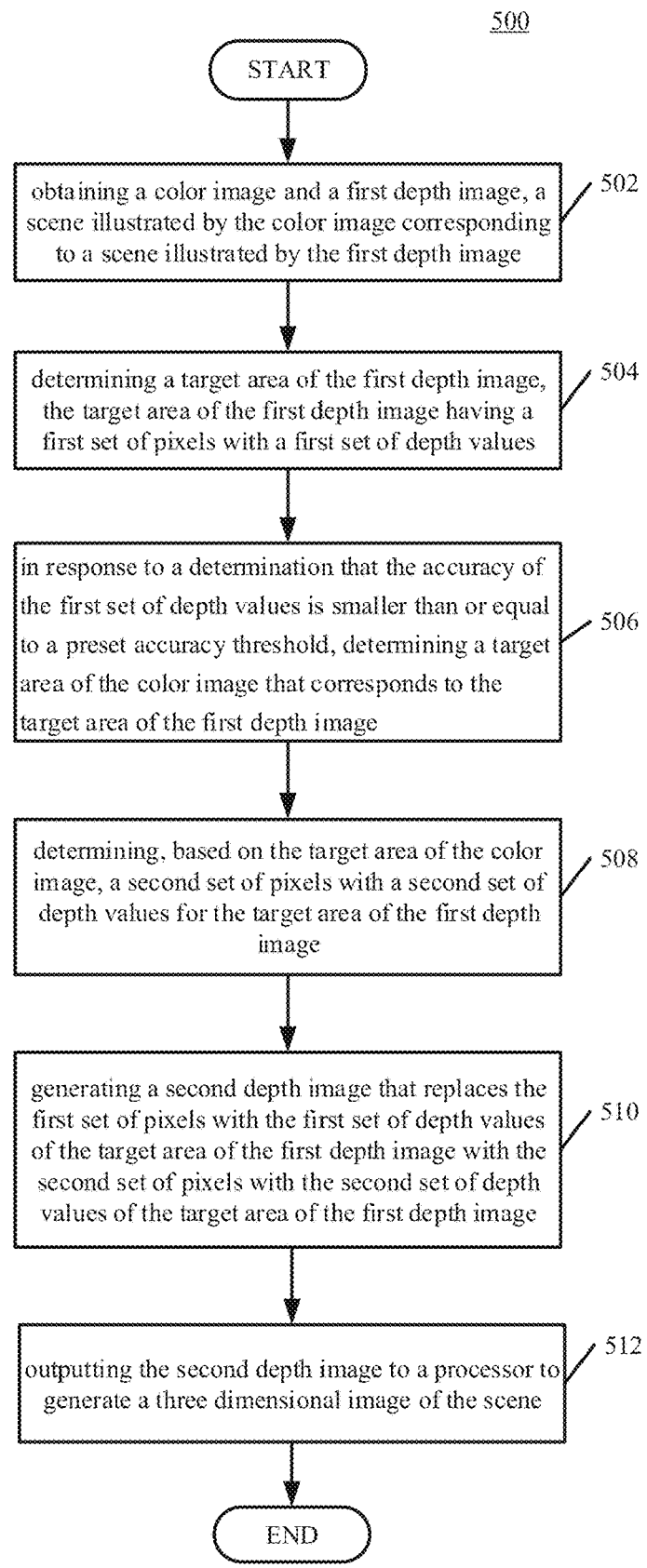
FIG. 5 is an exemplary flowchart depicting a process for depth images having pixels with accurate depth values according to yet another exemplary embodiment of the present disclosure.

FIG. 5 is an exemplary flowchart depicting a process 500 for depth images having pixels with accurate depth values according to an exemplary embodiment of the present disclosure. In this embodiment, the process for depth images having pixels with accurate depth values is described in more detail.

At step 502, a processor obtains a color image and a first depth image. A scene illustrated by the color image corresponds to a scene illustrated by the first depth image.

In some exemplary embodiments, a color image may be a digital color image, which includes color information for each pixel. For example, the color information provides three values for red, green, and blue (RGB) of each pixel, which may be interpreted as coordinates in some color space. For example, RGB color space may be used for displaying a color image. Different weighted combinations of RGB for each pixel enable a showing of more than 300 thousand colors in a color image, which can be distinguished by a human eye. 8, 16, or 24 bits per pixel may be used for a color image format.

In some exemplary embodiments, a first depth image may include information relating to distances of surfaces of scene objects from a viewpoint. For example, a viewpoint may be a central axis of view of an electronic device, which may be in the direction of the electronic device's Z axis. Thus, it may be regarded as depth information of the scene objects. A first depth image may show luminance in proportion to the distance from the electronic device. For example, a viewpoint may be a central axis of view of a nominal focal plane. Thus, a first depth image may also show luminance in relation to the distance from a nominal focal plane.

In some exemplary embodiments, the color image and the first depth image are generated by an electronic device or by different electronic devices, and then, are received through wired or wireless connections. These electronic devices are equipped with a LiDAR system, and therefore, are able to generate first depth images. These electronic devices can be also equipped with software to generate first depth images. These electronic devices may be mobile devices, such as a mobile phone, a personal application device (PAD), etc.

In some instances, due to limited power consumption of a mobile device, the first depth image is not sufficiently accurate, that is, the first depth image includes pixels with less accurate depth values. Software is usually used to complement the first depth image, however, in some examples, it still cannot provide a depth image having pixels with satisfying depth values. The process described herein further generates a second depth image including pixels with more accurate and satisfying depth values.

In some exemplary embodiments, a scene illustrated by the color image corresponds to a scene illustrated by the first depth image, that is, the color image can be regarded as the color image of the first depth image. In some examples, the scene illustrated by the color image and the scene illustrated by the first depth image may include a same scene. In some examples, the scene illustrated by the color image and the scene illustrated by the first depth image may include a partially same scene. In some examples, these scenes may be for casual or professional purposes. In some examples, the color image may be a panoramic color image. Accordingly, the first depth image may be a panoramic depth image.

At step 504, the processor determines a target area of the first depth image. The target area of the first depth image has a first set of pixels with a first set of depth values. Determining the target area is described above.

In some exemplary embodiments, the target area of the first depth image is a rectangular-shape area within the first depth image. The target area of the first depth image may be an area of other shapes within the first depth image. In some examples, the target area of the first depth image is located in the middle of the first depth image. The target area of the first depth image may be located in any place within the first depth image.

At step 506, the processor determines a target area of the color image that corresponds to the target area of the first depth image, in response to a determination that the accuracy of the first set of depth values is less than or equal to a preset accuracy threshold.

At step 508, the processor determines, based on the target area of the color image, a second set of pixels with a second set of depth values for the target area of the first depth image.

In some exemplary embodiments, the second set of pixels with the second set of depth values for the target area of the first depth image may be also determined based on the target area of the color image and the target area of the first depth image in relation to the first depth image. For example, depending on the accuracy of the first set of depth values, the target area of the first depth image may be located in the middle of the first depth image. For instance, the target area of the first depth image may be located in any place within the first depth image.

At step 510, the processor generates a second depth image that replaces the first set of pixels with the first set of depth values of the target area of the first depth image with the second set of pixels with the second set of depth values of the target area of the first depth image.

In some exemplary embodiments, the processor first marks the target area of the first depth image to obtain a marked first depth image. The processor then inputs the color image and the marked first depth image into a depth model to generate the second depth image. The depth model may be a model that has been trained in advance for generating the second depth image based on the color image and the marked first depth image.

For example, when using the confidence scale to determine whether an accuracy of each depth value of each pixel of the entire first depth image is sufficiently high, the processor marks any pixels with a confidence scale less than a certain value such as 2. These pixels with a confidence scale less than 2 may be set to a depth value of 0. It should be noted that the first depth image itself includes pixels with a depth value of 0. That means no depth values are or can be measured at these pixels, and therefore, the LiDAR system or the electronic device does not provide depth values for these pixels. For these pixels with an original depth value of 0, there is no need to re-determine depth values or to determine a second set of depth values. However, depth values need to be re-determined or a second set of depth values needs to be determined for the pixels of the first depth image with a depth value of 0 that is set through the foregoing discussed process.

In some exemplary embodiments, the depth model includes an encoder, a decoder, and a downsampler. The depth model conducts the following steps to generate the second depth image by having the color image and the marked first depth image as an input of the depth model:

First, the encoder generates, based on the color image, data representing the characteristics of the color image. For instance, by feeding data into the neural network for training or learning, the method of extracting features (e.g., characteristics) of the color image and/or the characteristics themselves may be determined.

Second, the downsampler generates, based on the marked first depth image, data representing the characteristics of the marked first depth image. For instance, by feeding data into the neural network for training or learning, the method of extracting features (e.g., characteristics) of the depth image and/or the characteristics themselves may be determined.

Third, the decoder generates, based on the data representing the characteristics of the color image and the data representing the characteristics of the marked first depth image, the second depth image.

In some exemplary embodiments, the encoder of the depth model performs downsampling on the color image. The encoder includes one more layer than the decoder or the downsampler of the depth model, that is, one downsampling layer more than that of the decoder or the downsampler of the depth model. For example, referring to FIG. 7, which shows a depth model 700 that includes an encoder 711, Enc 1 of the encoder 711 may be regarded as a layer. For example, the encoder of the depth model may include five downsampling layers, while the decoder or the downsampler of the depth model may include four downsampling layers. Other arrangements of downsampling layers of the encoder, the decoder and the downsampler may be also applied. A layer may be one convolution layer, or may be a combination of more than one convolution layers.

In some exemplary embodiments, the depth model may be trained in advance to generate the second depth image based on the color image and the marked first depth image. For example, a process of training the depth model may first include obtaining a set of training samples. The set of training samples include input data and expected output data that corresponds to the input data. The input data includes color image samples and first depth image samples that correspond to the color image samples. The first depth image samples are marked to obtain marked first depth image samples. The expected output data includes expected second depth image samples.

In some exemplary embodiments, a scene illustrated by the color image samples corresponds to a scene illustrated by the first depth image samples. The color image samples may be regarded as color image samples of the first depth image samples. In some examples, the scene illustrated by the color image samples and the scene illustrated by the first depth image samples may include a same scene. In some examples, the scene illustrated by the color image samples and the scene illustrated by the first depth image samples may include a partially same scene. In some examples, these scenes may be for casual or professional purposes. In some examples, the color image samples may be panoramic color image samples. Accordingly, the first depth image samples may be panoramic first depth image samples.

In some exemplary embodiments, the marked first depth image samples described above comprise a rectangular area. The rectangular area may be a position indicated by position information of the set of training samples. The rectangular area may be randomly determined. The rectangular area may have a third set of pixels with a third set of depth values.

In some exemplary embodiments, the expected second depth image samples described above may be image samples that replace the third set of pixels with the third set of depth values of the rectangular area of the marked first depth image samples with a fourth set of pixels with a fourth set of depth values of the rectangular area of the marked first depth image samples. An accuracy of each depth value of the fourth set of depth values is larger than the preset accuracy threshold. In some examples, an accuracy of each depth value of each pixel of the expected second depth image samples described above may be larger than the preset accuracy threshold.

In some exemplary embodiments, a loss function may be used to train the depth model.

At step 512, the processor outputs the second depth image to a processor to generate a three dimensional image of the scene.

The second depth image provides a better basis than the first depth image for the processor to generate the three dimensional image of the scene. First, there are no visible seams between the target area and the second depth image after completing step 510. Second, noises in the first depth image are removed to obtain the second depth image. Overall, the accuracy of the second set of depth values is higher than that of the first set of depth values. Applications of this process may be for casual or professional purposes.

Figure 6:
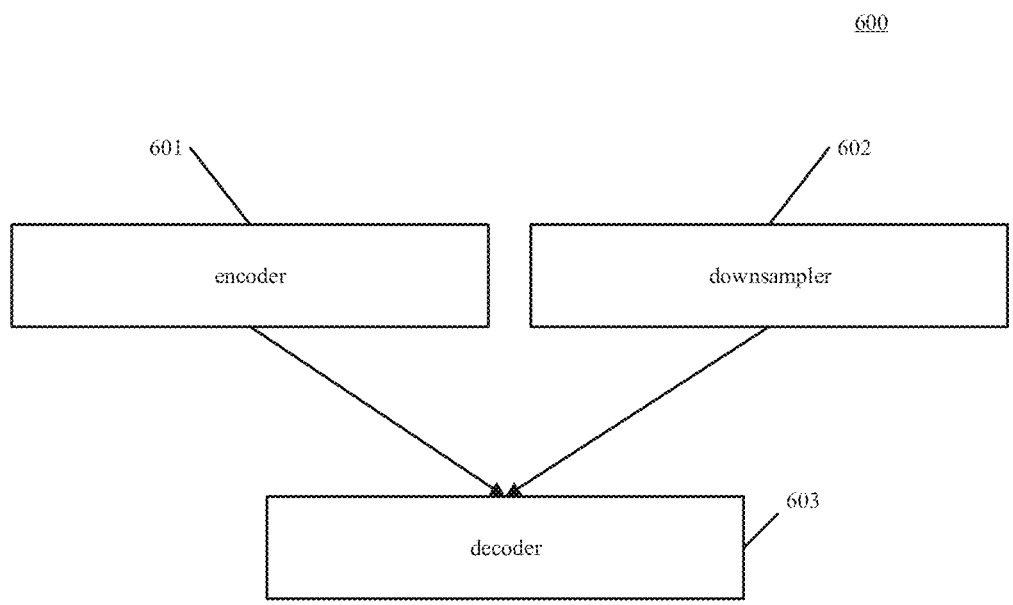
FIG. 6 is a schematic diagram of a depth model for the process for depth images having pixels with accurate depth values according to an exemplary embodiment of the present disclosure.

FIG. 6 is a schematic diagram of a depth model 600 for the process for depth images having pixels with accurate depth values according to an exemplary embodiment of the present disclosure.

In some exemplary embodiments, the depth model 600 includes an encoder 601, a downsampler 602, and a decoder 603. For example, the encoder 601 may include one or more layers that execute one or more downsampling (e.g., compression) functions on the color image received in the process, as shown in FIGS. 3-5. The encoder 601 may include and/or be a machine learning algorithm such as a neural network and/or a residual network (ResNet) ResNet 50 architecture. Additionally, and/or alternatively, the encoder 601 may include ResNet 101 architecture. The encoder 601 may also include other architectures. In each downsampling layer, the color image may be downsampled by a factor of 2 (e.g., every second sample is removed from the dataset such as the dataset representing the characteristics or pixel values of the color image, additionally, and/or alternatively, the length and the width of the color image are divided by a factor of 2, respectively). Other factor values may be also used. As such, the encoder 601 may perform one or more downsampling functions, which change the scale of data within the neural network. Additionally, and/or alternatively, each function of the encoder 601 may perform a downsampling function by a factor of 2. For instance, the input of the first portion of the encoder that performs the first downsampling function may be an original color image having a data size of H×W×3 and the output of the first function of the encoder may be data having a data size of H/2×W/2×3. Regarding the output data, the data may be a result of one or more convolution layers, average pooling layers, and/or other neural network functions. In other words, the output data for each downsampling layer may include downsampling as well as one or more convolution layer functions, average pooling functions, and/or other functions. The encoder 601 may execute multiple downsampling functions for the color image associated with multiple downsampling layers.

In some exemplary embodiments, the downsampler 602 may include one or more layers that executes one or more downsampling functions on the marked depth image received in the process, as shown in FIG. 4, or the marked first depth image received in the process, as shown in FIG. 5. In each downsampling function, the marked depth image may be downsampled by a factor of 2 (e.g., every second sample is removed from the dataset associated with the marked depth image, additionally, and/or alternatively, the length and the width of the marked depth image are divided by a factor of 2). Other factor values may be also used. For instance, the downsampler 602 may execute multiple downsampling functions, and each downsampling function may include downsampling as well as one or more convolution layer functions, average pooling functions, and/or other functions.

In some exemplary embodiments, the downsampler 602 may include and/or be a machine learning algorithm such as a neural network and/or a residual network (ResNet) ResNet 50 architecture. Additionally, and/or alternatively, the downsampler 602 may include ResNet 101 architecture. In some examples, the downsampler 602 may include one downsampling layer less than that of the encoder 601. That is, when pixels with depth values of a target area of a depth image are determined by the depth model, the number of downsampling functions executed by the downsampler 602 may be less than the number of downsampling functions executed by the encoder 601 by 1. In some examples, each downsampling function executed by the downsampler 602 may be the same as each downsampling function executed by the encoder 601 (e.g., may have the same downsampling factor such as a downsampling factor of 2). In some instances, in each downsampling function, a data size of an image may be downsampled to ½ of the dimension of the image.

In some exemplary embodiments, the decoder 603 may include and/or be a machine learning algorithm such as a neural network and/or a residual network (ResNet) ResNet 50 architecture. Additionally, and/or alternatively, the decoder 603 may include ResNet 101 architecture. In some examples, the decoder 603 includes one or more layers that executes one or more upsampling functions (e.g., expansion, interpolation, and/or resampling of data) on the input received from the encoder 601 and the downsampler 602, as shown in FIG. 6. For example, in each upsampling function, the data from the encoder 601 and the downsampler 602 may be upsampled by a factor of 2. Other factor values may be also used. The decoder 603 may execute multiple upsampling functions (e.g., each layer of the decoder 603 may upsample by a factor of 2), and each upsampling function may include one or more convolution layer functions, average pooling functions, and/or other functions. An output of the decoder 603 may include pixels with depth values of the target area of the depth image as shown in FIG. 4 or pixels with depth values of the target area of the first depth image as shown in FIG. 5.

In some exemplary embodiments, the depth model 600 for the process for depth images having pixels with accurate depth values may be trained in advance by the following steps.

First, a process of training the depth model 600 obtains a set of training samples. The set of training samples include input data and expected output data that corresponds to the input data. The input data includes color image samples and depth image samples that correspond to the color image samples. The depth image samples are marked to obtain marked depth image samples. The expected output data includes expected depth image samples. An accuracy of each depth value of each pixel of the expected second depth image samples described above may be larger than a preset accuracy threshold.

In some exemplary embodiments, within the set of training samples, the quantity of the training samples, the dimension of the color image samples, the dimension of the depth image samples, and etc. may be set based on individual needs. For example, 500 thousand color image samples and 500 thousand depth image samples that correspond to the 500 thousand color image samples may be arranged for the set of training samples. Each of the color image samples or each of the depth image samples has a length of 640 pixels and a width of 320 pixels.

Second, the process of training the depth model 600 uses a machine-learning algorithm, with the input data as an input and the expected output data as an expected output, to train and to obtain the depth model 600.

In some exemplary embodiments, within the set of training samples, an accuracy of a depth value of each pixel of the expected output data is larger than an accuracy threshold that is preset. Further, within the input data of the set of training samples, depth image samples have pixels with relatively accurate depth values. By training the depth model 600 through such set of training samples, accuracies of depth values of pixels of a target area of a depth image outputted by the depth model 600 are enhanced. This also means, accuracies of depth values of pixels of the entire depth image outputted by the depth model 600 are enhanced.

In some exemplary embodiments, the set of training samples, which include input data, including color image samples, depth image samples, and expected output data, may be generated by a LiDAR system that is embedded in an electronic device or a LiDAR device. The set of training samples may be also generated by a depth camera system that is embedded in an electronic device, depth camera, or a three-dimensional camera.

In some exemplary embodiments, a loss function of the depth model 600 may be determined. For example, the loss function of the depth model 600 may be determined based on a mean of relative error of actual output data and the expected output data. The actual output data is a depth image outputted by the depth model 600. The expected output data is within the set of training samples, which are used to train the depth model 600 in advance. The loss function of the depth model 600 may be determined based on a mean of relative error of the gradient of the actual output data and the gradient of the expected output data. The loss function the depth model may be determined based on a structural similarity (SSIM) between the actual output data and the expected output data.

SSIM is an indicator of a similarity level between two images or between two depth images. For example, from the perspective of an image composition, an SSIM theory defines structural information as independent information of brightness information or of contrast information. The structural information indicates properties of object structure within a scene that is illustrated by the image. A distortion modelling may be built based on a combination of 3 different factors, which includes brightness, contrast, and SSIM. Generally, an average value is used as an estimation of brightness, a standard deviation is used as an estimation of contrast, and a covariance value is used as an estimation of SSIM.

In some exemplary embodiments, the loss function of the depth model 600 determined as foregoing described may be expressed as follows:

$$L = k1 * 1\_depth + k2 * 1\_edge + k3 * 1\_ssim$$

L represents the loss function of the depth model 600, and k1, k2, and k3 may be 3 preset constants. The values of k1, k2, and k3 are based on a determination that a proportion of the second part of L, k2*1_edge, and the third part of L, k3*1_ssim is larger than a proportion of the first part of L, k1*1_depth. The first part of L, k1*1_depth, is a mean of relative error of actual output data and the expected output data. The second part of L, k2*1_edge, is a mean of relative error of the gradient of the actual output data and the gradient of the expected output data. The third part of L, k3*1_ssim, is a SSIM between the actual output data and the expected output data.

In some exemplary embodiments, based on any of the above described first, second, and third parts of L, various different loss functions of the depth model 600 may be made.

In some exemplary embodiments, based on at least one of the above described first, second, and third parts of L, a loss function of the depth model 600 may be made. Based on a calculated loss function of the depth model 600, accuracies of depth values of pixels of a target area of an image that is outputted by the depth model 600 are enhanced. Thereby, accuracies of depth values of pixels of that image are enhanced.

In some exemplary embodiments, the set of training samples includes position information. This position information indicates a position as a target area of the depth image samples. This target area of the depth image samples is randomly determined. Further, this target area of the depth image samples has pixels with depth values.

In some exemplary embodiments, an electronic device, such as a mobile phone which generates depth images, has limited power consumption available. The depth images generated by such a device may include areas without depth values. This disclosure provides using a rectangular area having pixels with depth values of the depth image samples, which is randomly determined, as a position indicated by the position information of the set of training samples. Based on the depth model 600, which is trained as such in advance, accuracies of depth values of pixels of a target area of an outputted image are enhanced. Thereby, accuracies of depth values of pixels of that outputted image are enhanced.

In some exemplary embodiments, this disclosure provides using a preset rectangular area having pixels with depth values of the depth image samples as a position indicated by the position information of the set of training samples. Based on the depth model 600, which is trained as such in advance, accuracies of depth values of pixels of a target area of an outputted image are enhanced. Thereby, accuracies of depth values of pixels of that outputted image are enhanced.

In some exemplary embodiments, a second depth image may be generated through the depth model 600 by inputting a color image and a first depth image as an input to the depth model 600. The first depth image has pixels with a first set of depth values. The second depth image has pixels with a second set of depth values. The second set of depth values is more accurate than the first set of depth values.

In some exemplary embodiments, the depth model 600 may additionally perform any of the following steps:

The depth model 600 marks a target area of the first depth image to obtain a marked first depth image.

The depth model 600 determines whether there are any depth values of pixels within the first depth image, whose accuracies are less than or equal to a preset accuracy threshold. Based on a determination of such pixels, the depth model 600 marks a target area having such pixels with such depth values within the first depth image.

Figure 7:
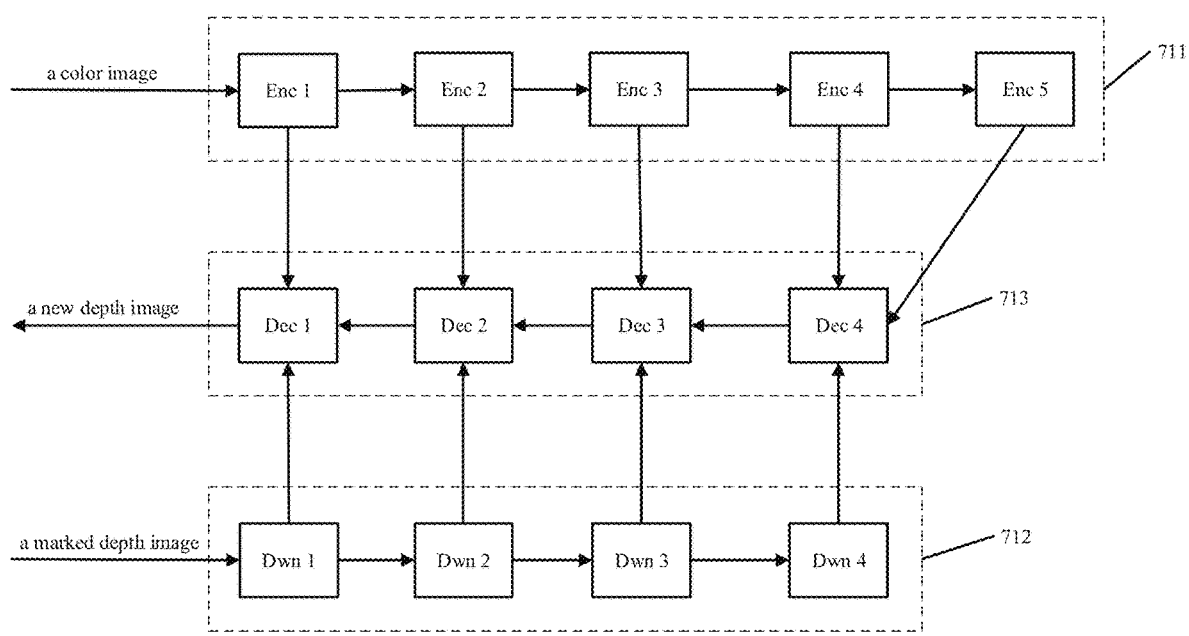
FIG. 7 is a schematic diagram of a depth model for the process for depth images having pixels with accurate depth values according to another exemplary embodiment of the present disclosure.

FIG. 7 is a schematic diagram of a depth model 700 for the process for depth images having pixels with accurate depth values according to another exemplary embodiment of the present disclosure.

In some exemplary embodiments, the depth model 700 includes an encoder 711, a downsampler 712, and a decoder 713. An input of the decoder 713 of the depth model 700 may include an output from the encoder 711 of the depth model 700 and an output from the downsampler 712 of the depth model 700. An output of the decoder 713 may include data. The data may be depth values of pixels of a target area. An input of the encoder 711 may include a color image. An input of the downsampler 712 may include a marked depth image. The marked area may be the target area.

In some exemplary embodiments, the encoder 711 executes one or more downsampling functions on the color image received as the input, as shown in FIGS. 3-5. The encoder 711 may include and/or be a machine learning algorithm such as a neural network and/or a residual network (ResNet) ResNet 50 architecture. Additionally, and/or alternatively, the encoder 711 may include ResNet 101 architecture. As shown in FIG. 7, the encoder 711 may include 5 downsampling layers, Enc 1, Enc 2, Enc 3, Enc 4, and Enc 5. Each of the Enc 1, Enc 2, Enc 3, Enc 4, and Enc 5 uses the ResNet 50 architecture conducting a downsampling function on its input color image by downsampling by a factor 2. For example, assuming an input color image of the Enc 1 has a data size of 1, output characteristic data of the Enc 1 has then a data size of $\frac{1}{2}$. In a similar manner, output characteristic data of the Enc 2 has a data size of $\frac{1}{4}$, output characteristic data of the Enc 3 has a data size of $\frac{1}{8}$, output characteristic data of the Enc 4 has a data size of $\frac{1}{16}$, and further, output characteristic data of the Enc 5 has a data size of $\frac{1}{32}$. Additionally, and/or alternatively, each downsampling layer of the encoder 711 may perform additional functions such as convolution functions, average pooling functions, and/or other functions (e.g., resizing).

In some exemplary embodiments, the downsampler 712 executes one or more downsampling functions on the marked depth image received as the input, as shown in FIGS. 4-5. The downsampler 712 may include and/or be a machine learning algorithm such as a neural network and/or a residual network (ResNet) ResNet 50 architecture and/or a neural network that combines functions of resizing and convolution. Additionally, and/or alternatively, the downsampler 712 may include ResNet 101 architecture. As shown in FIG. 7, the downsampler 712 may include 4 downsampling layers, Dwn 1, Dwn 2, Dwn 3, and Dwn 4. Each of the Dwn 1, Dwn 2, Dwn 3, and Dwn 4 uses the ResNet 50 architecture conducting a downsampling function on its input marked depth image by downsampling by a factor of 2. For example, assuming an input marked depth image of the Dwn 1 has a data size of 1, output characteristic data of the Dwn 1 has then a data size of $\frac{1}{2}$. In a similar manner, output characteristic data of the Dwn 2 has a data size of $\frac{1}{4}$, output characteristic data of the Dwn 3 has a data size of $\frac{1}{8}$, and further, output characteristic data of the Dwn 4 has a data size of $\frac{1}{16}$. Each of the Dwn 1, Dwn 2, Dwn 3, and Dwn 4 of the downsampler 712 may provide other functions than a downsampling function. For instance, referring to Dwn 2, the Dwn 2 may execute a downsampling function that reduces the data size by $\frac{1}{2}$. Additionally, and/or alternatively, the Dwn 2 may perform additional or alternatively functions such as resizing, convolution, and/or other various implementation methods.

In some exemplary embodiments, the decoder 713 executes one or more upsampling function on its input received from the encoder 711 and from the downsampler 712, as shown in FIG. 7. The decoder 713 may include and/or be a machine learning algorithm such as a neural network and/or a residual network (ResNet) ResNet 50 architecture. Additionally, and/or alternatively, the decoder 713 may include ResNet 101 architecture. The decoder 713 may include 4 upsampling layers, Dec 1, Dec 2, Dec 3, and Dec 4. Each of the Dec 1, Dec 2, Dec 3, and Dec 4 uses the ResNet 50 architecture conducting an upsampling function on its input received from the encoder 711 and from the downsampler 712, respectively. For example, assuming an input of the Dec 4 has a data size of $\frac{1}{32}$, an output of the Dec 4 has then a data size of $\frac{1}{16}$. As shown, the output of the Dec 4 is an input of Dec 3. In a similar manner, an output of the Dec 3 has a data size of $\frac{1}{8}$, an output of the Dec 2 has a data size of $\frac{1}{4}$, and further, an output of the Dec 1 has a data size of $\frac{1}{2}$.

In some exemplary embodiments, each of the Dec 1, Dec 2, Dec 3, and Dec 4 of the decoder 713 may execute an upsampling function on its input received from the encoder 711 and from the downsampler 712 by upsampling by a factor of 2. In addition, after executing the above described performance, each of the Dec 1, Dec 2, Dec 3, and Dec 4 of the decoder 713 may execute one or more convolution operations. For example, each of the Dec 1, Dec 2, Dec 3, and Dec 4 of the decoder 713 may include two convolution layers. In other examples, each of the Dec 1, Dec 2, Dec 3, and Dec 4 of the decoder 713 may include additional numbers of convolution layers and/or perform additional functions.

As shown in FIG. 7, the output characteristic data of the Enc 4 of the encoder 711 and the output characteristic data of the Enc 5 of the encoder 711 may be an input for the decoder 713 of the depth model 700, including the upsampling layer, the Dec 4, of the decoder 713. Further, the output characteristic data of the Enc 3 of the encoder 711 may be an input for the decoder 713, including the upsampling layer, the Dec 3, of the decoder 713. The output characteristic data of the Enc 2 of the encoder 711 may be an input for the decoder 713, including the upsampling layer, the Dec 2, of the decoder 713. The output characteristic data of the Enc 1 of the encoder 711 may be an input for the decoder 713, including the upsampling layer, the Dec 1, of the decoder 713.

As shown in FIG. 7, the output characteristic data of the Dwn 4 of the downsampler 712 may be an input for the decoder 713 of the depth model 700, including the upsampling layer, the Dec 4, of the decoder 713. Further, the output characteristic data of the Dwn 3 of the downsampler 712 may be an input for the decoder 713, including the upsampling layer, the Dec 3, of the decoder 713. The output characteristic data of the Dwn 2 of the downsampler 712 may be an input for the decoder 713, including the upsampling layer, the Dec 2, of the decoder 713. The output characteristic data of the Dwn 1 of the downsampler 712 may be an input for the decoder 713, including the upsampling layer, the Dec 1, of the decoder 713.

As shown in FIG. 7, after the output characteristic data of the Enc 5 of the encoder 711 is inputted to the decoder 713 of the depth model 700, including the upsampling layer, the Dec 4, of the decoder 713, this output characteristic data may be upsampled a factor of 2. The upsampled output characteristic data, the output characteristic data of the Enc 4 of the encoder 711, and the output characteristic data of the Dwn 4 of the downsampler 712 may be first spliced, and then be upsampled by a factor of 2. After the output characteristic data of the Enc 3 of the encoder 711 and the output characteristic data of the Dwn 3 of the downsampler 712 are inputted to the decoder 713 of the depth model 700, including the upsampling layer, the Dec 3 of the decoder 713, the two output characteristic data may be first spliced, and then be upsampled by a factor of 2. After the output characteristic data of the Enc 2 of the encoder 711 and the output characteristic data of the Dwn 2 of the downsampler 712 are inputted to the decoder 713 of the depth model 700, including the upsampling layer, the Dec 2 of the decoder 713, the two output characteristic data may be first spliced, and then be upsampled by a factor of 2. After the output characteristic data of the Enc 1 of the encoder 711 and the output characteristic data of the Dwn 1 of the downsampler 712 are inputted to the decoder 713 of the depth model 700, including the upsampling layer, the Dec 1 of the decoder 713, the two output characteristic data may be first spliced, and then be upsampled by a factor of 2.

An output of the Dec 1 of the decoder 713 may include data such as depth values of pixels of a target area for a new depth image.

Figure 8A:
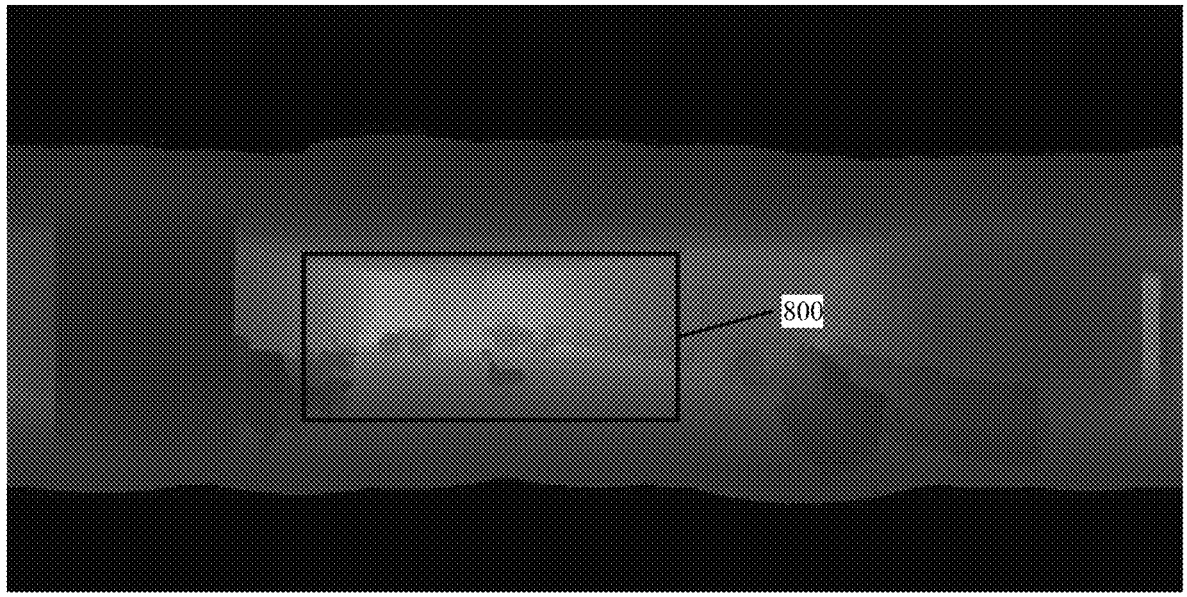
FIG. 8A is a depth image according to an exemplary embodiment of the present disclosure.
Figure 8B:
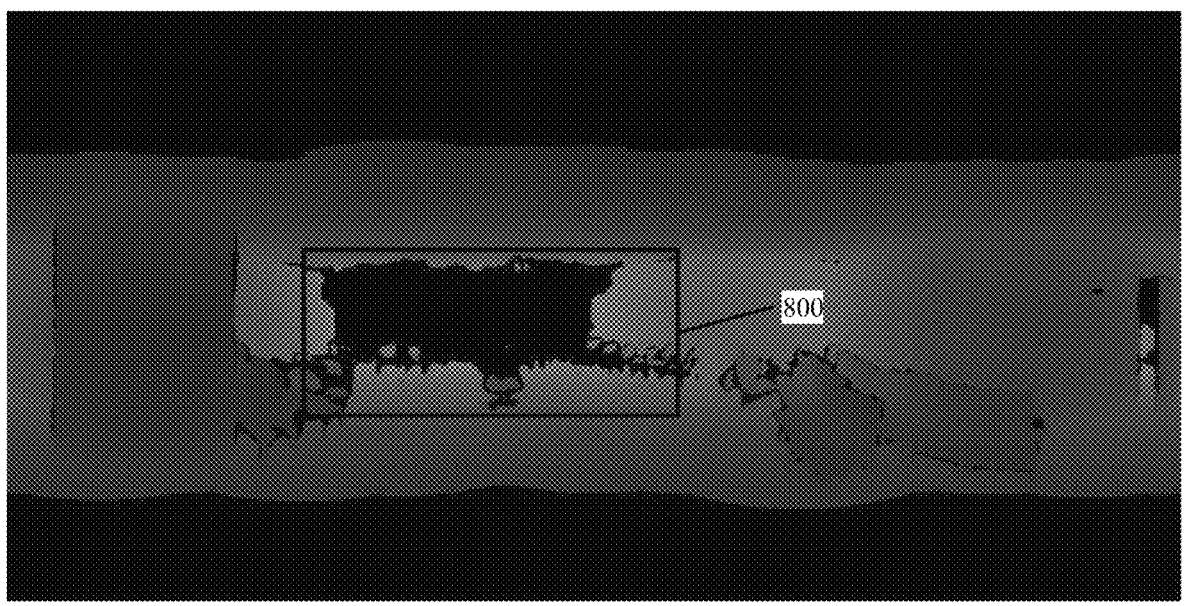
FIG. 8B is a depth image according to another exemplary embodiment of the present disclosure.

FIG. 8A is a depth image according to an exemplary embodiment of the present disclosure. FIG. 8B is a depth image according to another exemplary embodiment of the present disclosure.

A confidence scale is used to determine whether an accuracy of each depth value of each pixel of a depth image is sufficiently high. For example, the confidence scale can be 0, 1, 2, etc. The higher the confidence scale, the more accurate a depth value that corresponds to a pixel of the depth image. As shown in FIG. 8A, a target area 800, that is, the black area of the depth image indicated also as 800 in FIG. 8B, has pixels. An accuracy of each depth value of each pixel of the target area is less than a confidence scale of 2. A process for complementing the target area may be discussed below. Further, a color image that corresponds to the depth image may be used to assist the process for complementing the target area. Through the process, the depth values of the pixels of the non-target area of the depth image remain unchanged, while the depth values of the pixels of the target area of the depth image are improved. In addition, the boundary between the target area and the non-target area of the depth image may be smooth after the process. The process is conducted by using the depth model 600 as shown in FIG. 6 and/or the depth model 700 as shown in FIG. 7.

It should be noted that the depth image shown in FIG. 8A itself includes one or more black areas, which means there are pixels with a depth value of 0. No depth values are or can be measured at these pixels, and therefore, a LiDAR system does not provide a depth value for these pixels. For these pixels with an original depth value of 0, that is, the one or more black areas as shown in FIG. 8A, there is no need to complement. The area of the depth image needs to be complemented is the black area as shown in FIG. 8B that is not shown as the black area in FIG. 8A, which is indicated as the target area 800 in FIGS. 8A and 8B.

Figure 9:
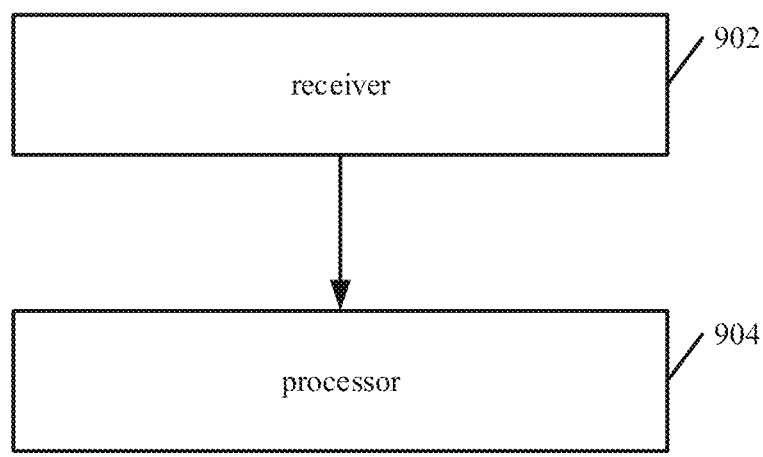
FIG. 9 is a schematic diagram of a device for depth images having pixels with accurate depth values according to an exemplary embodiment of the present disclosure.

FIG. 9 is a schematic diagram of a device 900 for depth images having pixels with accurate depth values according to an exemplary embodiment of the present disclosure. The device 900 for depth images having pixels with accurate depth values may be applied to any kinds of electronic devices or systems. The device 900 for depth images having pixels with accurate depth values may be used to perform the methods as described according to FIGS. 3-5.

In some exemplary embodiments, the device 900 includes a receiver 902 and a processor 904. The receiver 902 receives a color image and a depth image. A scene illustrated by the color image corresponds to a scene illustrated by the depth image. In response to a target area of the depth image, the processor 904 re-determines, based on the color image, depth values of pixels of the target area of the depth image to obtain a new depth image. An accuracy of each depth value of each pixel of the target area of the depth image is less than or equal to a preset accuracy threshold.

After the receiver 902 receives the color image and the depth image, the processor 904 determines an accuracy of each depth value of each pixel of the depth image through various formulas or machine-learning algorithm. In some examples, the receiver 902 may receive an accuracy of each depth value of each pixel of the depth image, which is provided by an electronic device while generating the depth image. The processor 904 then determines a target area of the depth image. An accuracy of each depth value of each pixel of the target area of the depth image is less than or equal to a preset accuracy threshold.

In some exemplary embodiments, the receiver 902 receives a color image and a depth image. A scene illustrated by the color image corresponds to a scene illustrated by the depth image. In response to a target area of the depth image, the processor 904 re-determines, based on the color image and the target area in relation to the depth image, depth values of pixels of the target area of the depth image to obtain a new depth image. An accuracy of each depth value of each pixel of the target area of the depth image is less than or equal to a preset accuracy threshold. The determination of the target area of the depth image is similar to the one described above.

In some exemplary embodiments, the receiver 902 receives a color image and a first depth image. A scene illustrated by the color image corresponds to a scene illustrated by the first depth image. The processor 904 determines a target area of the first depth image. The target area of the first depth image has a first set of pixels with a first set of depth values. In response to a determination that the accuracy of the first set of depth values is less than or equal to a preset accuracy threshold, the processor 904 determines a target area of the color image that corresponds to the target area of the first depth image. In some examples, the processor 904 determines a target area of the first depth image based on an accuracy of each depth value of each pixel of the first depth image. The target area of the first depth image has a first set of pixels with a first set of depth values, and the accuracy of the first set of depth values is less than or equal to a preset accuracy threshold. The processor 904 then determines a target area of the color image that corresponds to the target area of the first depth image.

The processor 904 further determines, based on the target area of the color image, a second set of pixels with a second set of depth values for the target area of the first depth image. The processor 904 then generates a second depth image that replaces the first set of pixels with the first set of depth values of the target area of the first depth image with the second set of pixels with the second set of depth values of the target area of the first depth image. The second depth image may be further outputted by a transmitter (not shown) to another processor to generate a three-dimensional image of the scene.

In some exemplary embodiments, the processor 904 marks the target area of the first depth image to obtain a marked first depth image. The processor 904 then inputs the color image and the marked first depth image into a depth model. The depth model is trained in advance for generating the second depth image based on the color image and the marked first depth image. The depth model includes an encoder, a decoder, and a downsampler. The encoder generates, based on the color image, data representing the characteristics of the color image. The downsampler generates, based on the marked first depth image, data representing the characteristics of the marked first depth image. The decoder generates, based on the data representing the characteristics of the color image and the data representing the characteristics of the marked first depth image. In addition, the encoder performs downsampling on the color image, and includes one downsampling layer more than that of the downsampler.

In some exemplary embodiments, the training of the depth model includes first obtaining a set of training samples. The set of training samples includes input data and expected output data that corresponds to the input data. The input data includes color image samples and first depth image samples that correspond to the color image samples. The first depth image samples are marked. Further, the expected output data includes expected second depth image samples. An accuracy of each depth value of each pixels of the expected second depth image samples is larger than the preset accuracy threshold. A machine-learning algorithm having the input data as an input and the expected output data as an expected output is then used to train the depth model.

In some exemplary embodiments, the marked first depth image samples include a rectangular area. The rectangular area is a position indicated by position information of the set of training samples. The rectangular area is randomly determined and has a third set of pixels with a third set of depth values. The expected second depth image samples are image samples that replace the third set of pixels with the third set of depth values of the rectangular area of the marked first depth image samples with a fourth set of pixels with a fourth set of depth values of the rectangular area of the marked first depth image samples. An accuracy of each depth value of the fourth set of depth values is larger than the preset accuracy threshold. In some examples, an accuracy of each depth value of each pixel of the expected second depth image samples described above may be larger than the preset accuracy threshold.

In some exemplary embodiments, the loss function of the depth model may be determined based on a mean of relative error of actual output data and the expected output data. The loss function of the depth model may be determined based on a mean of relative error of the gradient of the actual output data and the gradient of the expected output data. The loss function of the depth model may be determined based on a structural similarity between the actual output data and the expected output data.

In some exemplary embodiments, a scene illustrated by the color image samples may correspond to a scene illustrated by the first depth image samples. In some examples, a scene illustrated by the color image samples may partially correspond to a scene illustrated by the first depth image samples. In some examples, the color image samples may be panoramic color image samples. Accordingly, the first depth image samples may be panoramic first depth image samples. The color image samples and the first depth image samples may be generated by a LiDAR system embedded in a mobile device. The color image samples and the first depth image samples may be generated by software installed in a mobile device.

Figure 10:
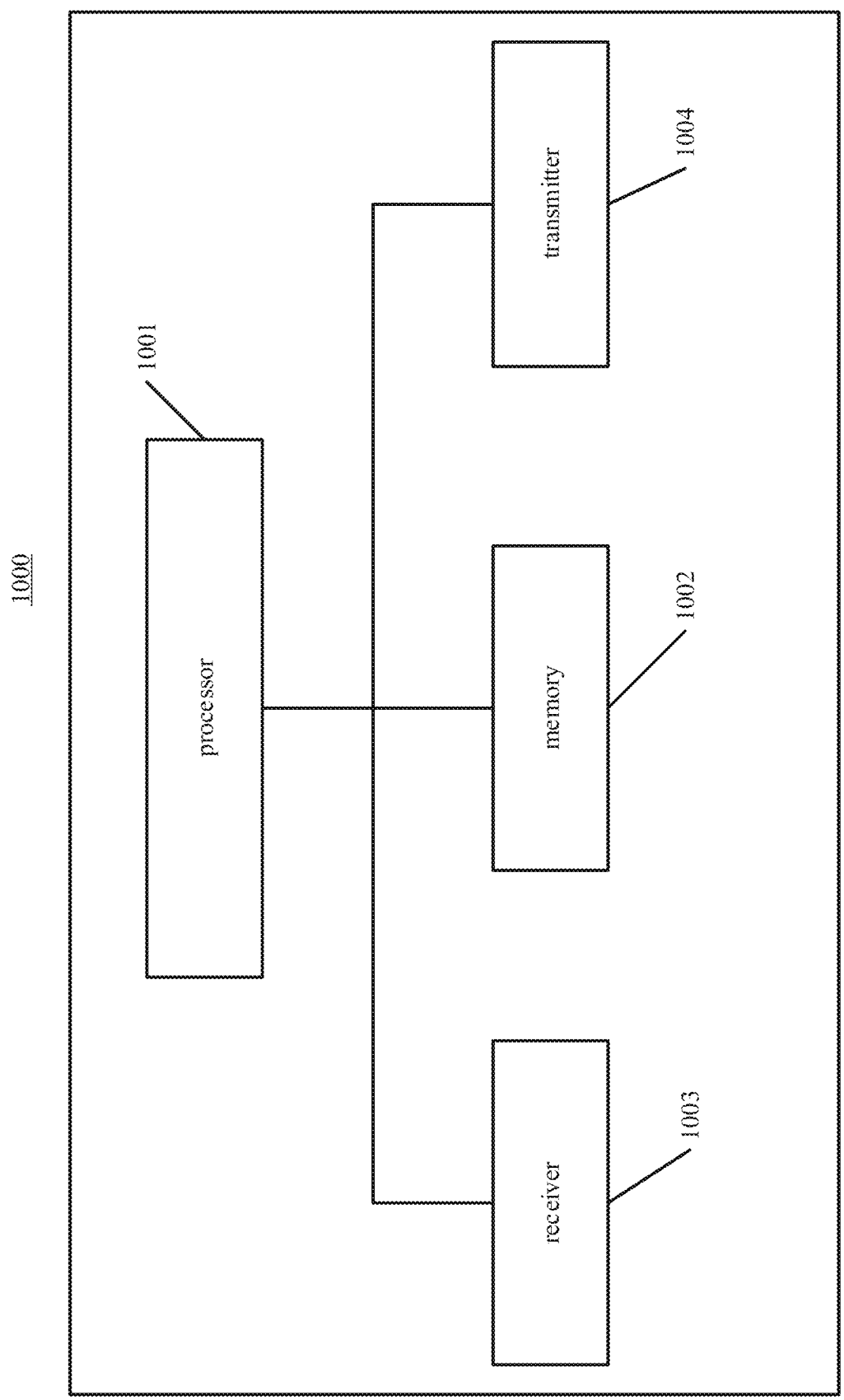
FIG. 10 is a schematic diagram of a device for depth images having pixels with accurate depth values according to another exemplary embodiment of the present disclosure.

FIG. 10 is a schematic diagram of a device 1000 for depth images having pixels with accurate depth values according to another exemplary embodiment of the present disclosure. The device 1000 for depth images having pixels with accurate depth values includes a processor 1001, a memory, 1002, a receiver 1003, and a transmitter 1004.

The processor 1001 may be a central processing unit (CPU) that is capable of processing data and executing instructions. The processor 1001 may also control other components of the device 1000 to perform functions.

The memory 1002 may include one or more computer program products. The one or more computer program products may include various forms of computer-readable storage media, including volatile memory and/or non-volatile memory. The volatile memory may include random access memory (RAM) and/or cache memory (cache). The non-volatile memory may include read-only memory (ROM), hard disk, flash memory, etc. One or more computer program instructions may be stored on a computer-readable storage medium, the processor 1001 may execute the one or more computer program instructions to implement the methods according to various embodiments of this disclosure. Other contents, such as input signals, signal components, and noises may also be stored on a computer-readable storage medium.

The receiver 1003 and the transmitter 1004 are interconnected by a bus system and/or other forms of connection mechanisms. For example, the receiver 1003 may be a microphone or a microphone array for capturing signals of a sound source. The receiver 1003 may be a communication network connector for receiving signals of a sound source that are captured by another device. The receiver 1003 may be a keyboard, a mouse, etc. The transmitter 1004 may output information, including determined distance information, determined direction information, etc. The transmitter 1004 may include a display, a speaker, a printer, a communication network and any remote output devices that are connected to the communication network, etc.

It should be noted that FIG. 10 shows the components that are related to the embodiments described in this disclosure. The device 1000 may include any other components for perform functions described herein.

Embodiments of this disclosure may also be computer program products that include computer program instructions, which when executed by a processor, cause the processor to perform the methods according to the embodiments of this disclosure. The computer program products may be computer program codes written by a combination of one or more programming languages. The one or more programming languages may include object-oriented programming languages, including Java, C++, etc. The one or more programing language may include conventional procedural programming languages, including C language or other similar languages. The computer program codes may be executed entirely on a user's device, or partly on a user's device and partly on a remote device. The computer program codes may be executed entirely on a remote device or a server. The computer program codes may be executed as an independent software package.

Embodiments of this disclosure may also be a computer program medium having computer program instructions stored thereon, which when executed by a processor, cause the processor to perform the methods according to the embodiments of this disclosure. A computer-readable storage medium may be a combination of one or more computer-readable storage media. The computer-readable storage medium may be a readable signal medium or a readable storage medium. The readable storage medium may include but is not limited to an electrical, magnetic, optical, electromagnetic, infrared, or semiconductor system, device, or a combination thereof. For example, the computer-readable storage medium may include electrical connection with one or more wires, portable disks, hard disks, RAM, ROM, erasable type programmable read only memory (EPROM or flash memory), optical fiber, portable compact disk read only memory (CD-ROM), optical storage device, magnetic storage device, or any combination thereof.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those exemplary embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method, comprising:
   obtaining a color image and a first depth image, wherein a scene illustrated by the color image corresponds to a scene illustrated by the first depth image;
   determining a target area of the first depth image, the target area of the first depth image having a first set of pixels with a first set of depth values, wherein each depth value of the first set of depth values is associated with an accuracy indicating a value on a confidence scale that is below a preset accuracy threshold, wherein each pixel of the first set of pixels is assigned a preset value based on evaluating the corresponding accuracy, and wherein determining the target area is based on identifying the pixels assigned with the preset value after evaluating the corresponding accuracy based on the corresponding depth value from the first set of depth value;
   determining a target area of the color image that corresponds to the target area of the first depth image;
   determining, based on the target area of the color image, a second set of pixels with a second set of depth values for the target area of the first depth image;
   generating a second depth image that replaces the first set of pixels of the first depth image with the second set of pixels with the second set of depth values; and
   outputting the second depth image to a processor to generate a three dimensional image of the scene.

2. The method of claim 1, wherein determining, based on the target area of the color image, the second set of pixels with the second set of depth values for the target area of the first depth image comprises:
   determining, based on the target area of the color image and the target area of the first depth image in relation to the first depth image, the second set of pixels with the second set of depth values for the target area of the first depth image.

3. The method of claim 2, wherein determining the second set of pixels with the second set of depth values for the target area of the first image is based on:
   obtaining a marked first depth image by marking the target area of the first depth image,
   wherein generating the second depth image is based on inputting the color image and the marked first depth image into a depth model.

4. The method of claim 3, wherein the depth model comprises an encoder, a decoder, and a downsampler, and wherein generating the second depth image by inputting the color image and the marked first depth image into the depth model comprises:
   generating, by the encoder based on the color image, data representing characteristics of the color image;
   generating, by the downsampler based on the marked first depth image, data representing the characteristics of the marked first depth image; and
   generating, by the decoder based on the data representing the characteristics of the color image and the data representing the characteristics of the marked first depth image, the second depth image.

5. The method of claim 4, wherein the encoder performs downsampling on the color image, wherein the encoder comprises one downsampling layer more than that of the downsampler.

6. The method of claim 3, further comprising training the depth model, wherein training the depth model comprises:
obtaining a set of training samples, the set of training samples comprising input data and expected output data that corresponds to the input data, wherein the input data comprises color image samples and first depth image samples that correspond to the color image samples, the first depth image samples being marked, and wherein the expected output data comprises expected second depth image samples; and
training, by using a machine learning algorithm having the input data as an input and the expected output data as an expected output to obtain the depth model.

7. The method of claim 6, wherein the marked first depth image samples comprise a rectangular area, the rectangular area being a position indicated by position information of the set of training samples, and wherein the rectangular area is randomly determined and has a third set of pixels with a third set of depth values.

8. The method of claim 7, wherein the expected second depth image samples are image samples that replace the third set of pixels with the third set of depth values of the rectangular area of the marked first depth image samples with a fourth set of pixels with a fourth set of depth values of the rectangular area of the marked first depth image samples, the fourth set of depth values is larger than the preset accuracy threshold.

9. The method of claim 7, wherein a loss of the depth model is determined based on at least one of: a mean of relative error of actual output data and the expected output data, a mean of relative error of a gradient of the actual output data and a gradient of the expected output data, or a structural similarity between the actual output data and the expected output data.

10. The method of claim 1, wherein determining the target area of the first depth image comprises:
obtaining an accuracy map for the first depth image, wherein the accuracy map indicates a value on the confidence scale for each pixel within the first depth image;
assigning the preset value to the pixels of the first set of pixels of the first depth image based on comparing the values from the accuracy map with the preset accuracy threshold; and
determining the target area based on identifying the pixels from the first depth image that are assigned with the preset value.

11. A device, the device comprising a processor and a non-transitory memory coupled to the processor and having processor-executable instructions stored thereon which, when executed, cause the device to perform a method, comprising:
obtaining a color image and a first depth image, wherein a scene illustrated by the color image corresponds to a scene illustrated by the first depth image;
determining a target area of the first depth image, the target area of the first depth image having a first set of pixels with a first set of depth values, wherein each depth value of the first set of depth values is associated with an accuracy indicating a value on a confidence scale that is below a preset accuracy threshold, wherein each pixel of the first set of pixels is assigned a preset value based on evaluating the corresponding accuracy, and wherein determining the target area is based on identifying the pixels assigned with the preset value after evaluating the corresponding accuracy based on the corresponding depth value from the first set of depth value;
determining a target area of the color image that corresponds to the target area of the first depth image;
determining, based on the target area of the color image, a second set of pixels with a second set of depth values for the target area of the first depth image;
generating a second depth image that replaces the first set of pixels of the first depth image with the second set of pixels with the second set of depth values; and
outputting the second depth image to the processor to generate a three dimensional image of the scene.

12. The device of claim 11, wherein determining, based on the target area of the color image, the second set of pixels with the second set of depth values for the target area of the first depth image comprises:
determining, based on the target area of the color image and the target area of the first depth image in relation to the first depth image, the second set of pixels with the second set of depth values for the target area of the first depth image.

13. The device of claim 12, wherein determining the second set of pixels with the second set of depth values for the target area of the first image is based on:
obtaining a marked first depth image by marking the target area of the first depth image,
wherein generating the second depth image is based on inputting the color image and the marked first depth image into a depth model.

14. The device of claim 13, wherein the depth model comprises an encoder, a decoder, and a downsampler, and wherein generating the second depth image by inputting the color image and the marked first depth image into the depth model comprises:
generating, by the encoder based on the color image, data representing characteristics of the color image;
generating, by the downsampler based on the marked first depth image, data representing the characteristics of the marked first depth image; and
generating, by the decoder based on the data representing the characteristics of the color image and the data representing the characteristics of the marked first depth image, the second depth image.

15. The device of claim 14, wherein the encoder performs downsampling on the color image, wherein the encoder comprises one downsampling layer more than that of the downsampler.

16. The device of claim 13, the method further comprising training the depth model, wherein training the depth model comprises:
obtaining a set of training samples, the set of training samples comprising input data and expected output data that corresponds to the input data, wherein the input data comprises color image samples and first depth image samples that correspond to the color image samples, the first depth image samples being marked, and wherein the expected output data comprises expected second depth image samples; and
training, by using a machine learning algorithm having the input data as an input and the expected output data as an expected output to obtain the depth model.

17. The device of claim 16, wherein the marked first depth image samples comprise a rectangular area, the rectangular area being a position indicated by position information of the set of training samples, and wherein the rectangular area is randomly determined and has a third set of pixels with a third set of depth values.

18. The device of claim 17, wherein the expected second depth image samples are image samples that replace the third set of pixels with the third set of depth values of the rectangular area of the marked first depth image samples with a fourth set of pixels with a fourth set of depth values of the rectangular area of the marked first depth image samples, the fourth set of depth values is larger than the preset accuracy threshold.

19. The device of claim 17, wherein a loss of the depth model is determined based on at least one of: a mean of relative error of actual output data and the expected output data, a mean of relative error of a gradient of the actual output data and a gradient of the expected output data, or a structural similarity between the actual output data and the expected output data.

20. A non-transitory computer-readable medium, having computer-executable instructions stored thereon which, when executed by a processor of a device, cause the device to perform a method, comprising:
obtaining a color image and a first depth image, wherein a scene illustrated by the color image corresponds to a scene illustrated by the first depth image;
determining a target area of the first depth image, the target area of the first depth image having a first set of pixels with a first set of depth values, wherein each depth value of the first set of depth values is associated with an accuracy indicating a value on a confidence scale that is below a preset accuracy threshold, wherein each pixel of the first set of pixels is assigned a preset value based on evaluating the corresponding accuracy, and wherein determining the target area is based on identifying the pixels assigned with the preset value after evaluating the corresponding accuracy based on the corresponding depth value from the first set of depth value;
determining a target area of the color image that corresponds to the target area of the first depth image;
determining, based on the target area of the color image, a second set of pixels with a second set of depth values for the target area of the first depth image;
generating a second depth image that replaces the first set of pixels of the first depth image with the second set of pixels with the second set of depth values; and
outputting the second depth image to the processor to generate a three dimensional image of the scene.

* * * * *